(12) United States Patent
Stefanakos et al.

(10) Patent No.: US 11,851,616 B2
(45) Date of Patent: Dec. 26, 2023

(54) PROTECTION OF POLYMERIC/ORGANIC MATERIALS FROM PHOTODEGRADATION BY ENCAPSULATION

(71) Applicant: University of South Florida, Tampa, FL (US)

(72) Inventors: Elias K. Stefanakos, Dover, FL (US); Sesha S. Srinivasan, Lakeland, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 0 days.

(21) Appl. No.: 17/791,362

(22) PCT Filed: Feb. 11, 2022

(86) PCT No.: PCT/US2022/016116
§ 371 (c)(1),
(2) Date: Jul. 7, 2022

(87) PCT Pub. No.: WO2022/174032
PCT Pub. Date: Aug. 18, 2022

(65) Prior Publication Data
US 2023/0220273 A1    Jul. 13, 2023

Related U.S. Application Data

(63) and a continuation of application No. 16/610,107, filed on Nov. 1, 2019, now Pat. No. 11,359,137.
(Continued)

(51) Int. Cl.
*C09K 9/02* (2006.01)
*B01J 13/06* (2006.01)
(Continued)

(52) U.S. Cl.
CPC ............... *C09K 9/02* (2013.01); *B01J 13/06* (2013.01); *B01J 19/122* (2013.01); *C04B 14/36* (2013.01);
(Continued)

(58) Field of Classification Search
CPC .......... C09K 9/02; B01J 13/06; B01J 19/122; B01J 2219/0879; B01J 2219/0892;
(Continued)

(56) References Cited

U.S. PATENT DOCUMENTS

| 2010/0086768 | A1* | 4/2010 | Norsten | C08K 5/0041 428/407 |
| 2011/0262364 | A1* | 10/2011 | Wang | A61P 31/04 977/773 |
| 2017/0141382 | A1* | 5/2017 | Dadheech | H01M 4/13 |

FOREIGN PATENT DOCUMENTS

| CN | 108172794 A | * | 6/2018 | ............ B82Y 30/00 |
| JP | 2017186397 A | | 10/2017 | |
| WO | 2018204640 A1 | | 11/2018 | |

OTHER PUBLICATIONS

Fang et al., A Review of Near Infrared Reflectance Properties of Metal Oxide Nanostructures, GNS Science Report 2013/39, Jul. 2013, 26 pages.
(Continued)

*Primary Examiner* — Bijan Ahvazi
(74) *Attorney, Agent, or Firm* — QUARLES & BRADY LLP; Yakov Sidorin

(57) ABSTRACT

Structures of a particle containing a core and at least one shell, a metal oxide material of which is necessarily doped to ensure protection of a material of the core from photodegradation. The core can include any of a thermochromic material, a phase-change material, and a judiciously defined auxiliary material that in turn contains organic and/or poly-
(Continued)

meric material. Derivative products utilizing a plurality of such particles. Methodologies for producing such particles and derivative products.

15 Claims, 4 Drawing Sheets

Related U.S. Application Data

(60) Provisional application No. 63/148,368, filed on Feb. 11, 2021.

(51) Int. Cl.
    *B01J 19/12*    (2006.01)
    *C04B 14/36*    (2006.01)
    *C04B 16/00*    (2006.01)
    *C04B 20/10*    (2006.01)
    *C04B 26/02*    (2006.01)
    *C04B 28/04*    (2006.01)

(52) U.S. Cl.
CPC .......... *C04B 16/00* (2013.01); *C04B 20/1066* (2013.01); *C04B 26/02* (2013.01); *C04B 28/04* (2013.01); *B01J 2219/0879* (2013.01); *B01J 2219/0892* (2013.01); *B01J 2219/1203* (2013.01)

(58) Field of Classification Search
CPC .............. B01J 2219/1203; C04B 14/36; C04B 16/00; C04B 20/1066; C04B 26/02; C04B 28/04

See application file for complete search history.

(56) References Cited

OTHER PUBLICATIONS

Hauri et al., Photostability and Breakdown Products of Pigments Currently Used in Tattoo Inks, Curr Probl Dermatol, 2015, 48:164-169.
He et al., Photochromism in Composite and Hybrid Materials Based on Transition-Metal Oxides and Polyoxometalates, Progress in Materials Science, 2006, 51:810-879.
Karlessi et al., Improving the Performance of Thermochromic Coatings with the Use of UV and Optical Filters Tested under Accelerated Aging Conditions, International Journal of Low-Carbon Technologies, 2015, 10(1):45-61.
Liu et al., Innovative Design of Microencapsulated Phase Change Materials for Thermal Energy Storage and Versatile Applications: A Review, Sustainable Energy & Fuels, 2019, 3(5):1091-1149.
Vavra, Characterization of Photodegradable Polymers for UV-triggered Release from Microcapsules, Master's Thesis, Department of Chemistry and Chemical Engineering, Chalmers University of Technology, 2019, 84 pages.
Wu et al., Synthesis and Characterization of Carbon-Doped TiO2 Nanostructures with Enhanced Visible Light Response, Chem. Mater., 2007, 19:4530-4537.
PCT International Search Report and Written Opinion, PCT/US2022/016116, dated May 9, 2022, 20 pages.

\* cited by examiner

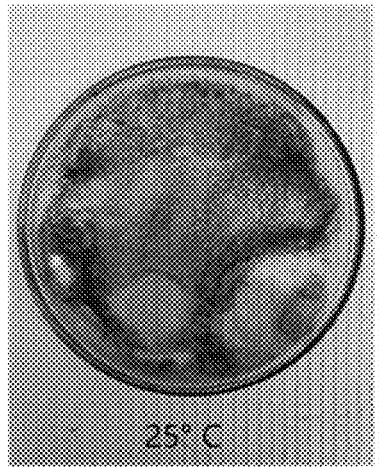  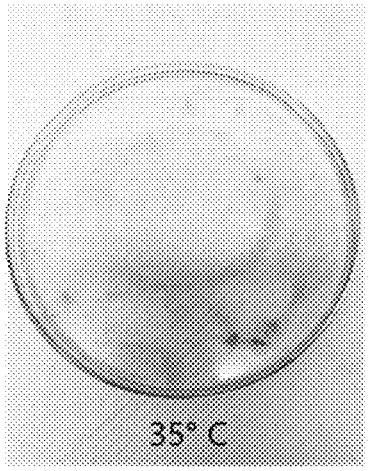
FIG. 1A  FIG. 1B  FIG. 1C
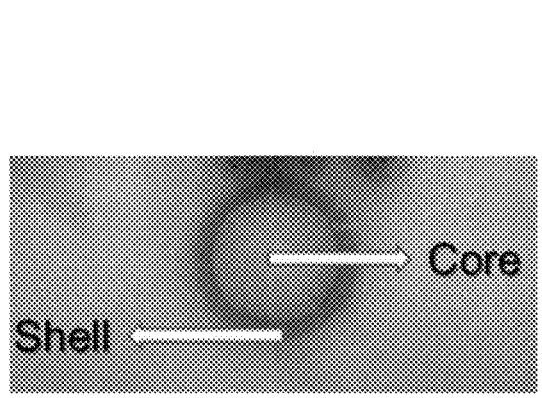 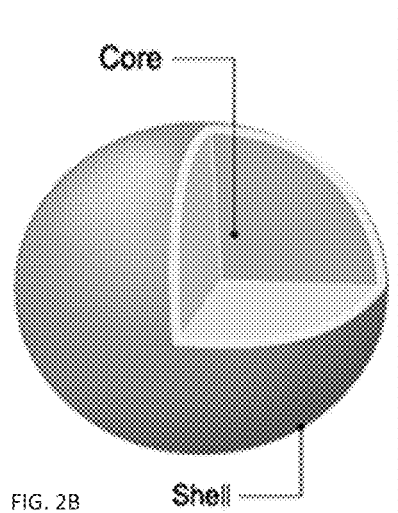
FIG. 2A  FIG. 2B

FIG. 5

PROTECTION OF POLYMERIC/ORGANIC MATERIALS FROM PHOTODEGRADATION BY ENCAPSULATION

CROSS-REFERENCE TO RELATED APPLICATIONS

The present application is a US national phase of pending International Patent Application No. PCT/US2022/016116 filed on Feb. 11, 2022, which claims priority from and benefit of a US provisional patent application No. 63/148,368 filed on Feb. 11, 2021. The disclosure of each of the above-identified patent applications is incorporated by reference herein.

RELATED ART

Photodegradation of a polymer is caused, in particular, when such polymeric material is exposed to sunlight (whether at a UV wavelength, an infrared wavelength, or even at a wavelength within the visible portion of the optical spectrum—depending on a specific polymer). The process of such photodegradation is attributed to photochemical reactions arising from the absorption of UV radiation and/or radiation in other spectral bands by carbonyl groups present in the polymer backbone. Photodegradation mechanisms are mainly expressed by the Norrish reactions that transform the polymers by photoionization (Norrish I) and chain scission (Norrish II), as known in related art.

As known in related art, the high energy electromagnetic (EM) waves are more harmful than the low energy EM-waves because the high frequency photons are substantially completely absorbed by the organic molecules in a rapid pace, and this negatively impacts their stability. Though the UV-A & UV-B radiation can have significant degradation effects on organic pigments, it has been demonstrated by Hauri et al. (see Photostability and breakdown products of pigments currently used in tatoo inks, *Curr. Probl. Dermatol. Basel, Karger* 48:164-169) that even visible light and at least near-IR light can produce discoloration effects with eventual mineralization and toxicity.

The sensitivity to light of synthetic polymer materials such as polyamide, polypropylene, and polyethylene, for example, depends on the molecular structure of these polymers. Even when a given synthetic polymer is treated with a UV stabilizer to increase the lifetime (longevity) of the polymer, the degradation occurs in outdoor environments particularly when exposed to strong sunlight. Half of all polymeric materials produced globally are used in outdoor applications: there is no surprise that photodegradation limits the useful lifetime of these materials to as little as 1 to 4 years. Cool roof coatings employing various polymeric materials, for example, can cost thousands of dollars, and it would be economically advantageous to extend the useful lifetimes of polymers used in such coatings. In another example, wearable fabrics composed of polymeric fibers may also degrade when used outside but may not be easily recyclable, and it would be environmentally advantageous to preserve the useful lifetimes of these fabrics.

Despite advances in research regarding the preservation of thermochromic materials (TCMs), for example, the methods that are effective for long-term preservation of the target material, that facilitate energy conservation and contribute to comfort, and that are economically advantageous remain scarce.

SUMMARY

Embodiments of invention provide a structured particle—referred to as a core-shell particle that includes i) a core containing a thermochromic material (TCM) and/or a phase-change material (PCM) and/or an auxiliary material containing organic and/or polymeric material and ii) an outer shell surrounding the core (here, the material of the outer shell is defined to contain a first metal oxide that necessarily includes a dopant). In at least one case, a TSM-based core is characterized in that the TCM includes an organic thermochromic material and/or a polymeric thermochromic material. In at least one case, a TCM-based core is characterized in that the TCM includes at least one of crystal violet lactone, spirolactones, fluorans, spirooxazine, and spiropyran.

In at least one case, the dopant includes a second metal oxide and/or nanoparticles of a metal; in at least one related case, the dopant includes exclusively nanoparticles of a metal. In each case when the dopant includes nanoparticles of the metal, such metal may be any of Ag, Au, Cu, Pt, Pd, Fe, Ni, Co, Zn, Ce, Al, Mn, In, W, Zr, Cr, Mo, Ru, and V. In substantially any implementation, the core-shell particle may additionally include an inner shell encapsulating the core and disposed between the core and the outer shell, in which case the inner shell is made of a polymeric material and, in a specific case of the latter, the polymeric material of the inner shell may contain a polyacrylate and/or a polymethacrylate and/or a poly(methacrylic acid). Alternatively or in addition, and substantially in every implementation of the core-shell particle, a thickness of the outer shell is at least 30 nm to prevent light at a wavelength from at least a UV-A spectral region from penetrating through the outer shell.

In substantially every implementation, the material of the outer shell may include $TiO_2$ and/or $ZnO$ and/or $SiO_2$ and/or $CuO$ and/or $In_2O_3$ and/or $CeO_2$ and/or $TiO_2$-$CeO_2$ and/or $SiO_2$-$CeO_2$ and/or indium-tin oxide (ITO) and/or antimony-tin oxide (ATO) and/or $WO_3$ and/or $ZnFe_2O_4$ and/or $Al_2O_3$ and/or $MnO$ and/or $ZrO$ and/or $NiO$ and/or $VO_2$ and/or $TiO_2$-$ZnFe_2O_4$, and/or $TiO_2$-$ZnO$, and/or $TiO_2$-$In_2O_3$, $TiO_2$-$SiO_2$-$CeO_2$ and, in at least one specific case, the material of the outer shell may be structured to include $TiO_2$ in an amount exceeding 50 weight % with at least a portion of a remainder being the dopant that includes metal nanoparticles and/or with a metal oxide material different from $TiO_2$. In at least one case, the material of the outer shell is characterized in that the dopant comprises includes a carbonaceous dopant and/or a nitrogenous dopant. When this is the case, the carbonaceous dopant may include any of hexane, heptane, benzene, toluene, activated carbon, carbon nanotubes, carbon nanofibers, graphene, and graphene oxide, while the nitrogenous dopant may include any of ammonia, boron nitride nanotubes, ammonium nitrate, urea, calcium nitrate, and potassium nitrate. In every embodiment of the invention, the material of the outer shell does not consist of a $SiO_2$.

Embodiments of the invention additionally provide a pigment that includes a plurality of core-shell particles configured according to an embodiment of the invention and, in a related case—a coating that includes such pigment and a binder material. An embodiment of a coating may be configured to satisfy any of the following conditions: a) the coating has a useful lifetime of at least 10 years, b) the coating is configured to absorb or reflect a first radiation having a first wavelength in a first range from about 320 nm to about 2500 nm to substantially prevent the first radiation from penetrating through the coating, while allowing a second radiation having a second wavelength outside the first range to pass through the coating, c) the coating is configured to absorb or reflect the first radiation having the first wavelength in a second range from about 390 nm to about 410 nm to substantially prevent the first radiation from being transmitted through the coating while allowing a third radiation having a third wavelength within the first range but outside the second range to pass through the coating, d) the coating is configured to absorb or reflect the first radiation having the first wavelength within a third range from about 410 nm to about 700 nm to substantially prevent the first radiation from being transferred through the coating while allowing a fourth radiation having a fourth wavelength within the firs range but outside the third range to pass through the coating: e) the coating is configured to absorb or reflect the first radiation having the first wavelength in a fourth range from about 690 nm to about 710 nm to substantially prevent the first radiation from being transmitted through the coating while allowing a fourth radiation having a fourth wavelength within the first range but outside the fourth range to pass through the coating, and f) the coating is configured to absorb or reflect the first radiation having the first wavelength within a fifth range from about 800 nm to about 1500 nm to substantially prevent the first radiation from being transmitted through the coating while allowing a fifth radiation having a fifth wavelength within the first range but outside the fourth range to pass through the coating.

Embodiments of the invention additionally provide a method that includes a step of mixing at least one fragment of a first material (that contains a thermochromic material (TCM) and/or a phase-change material (PCM) and/or an auxiliary material that includes an organic material and/or a polymeric material) with a surfactant in a solvent to form an emulsion precursor; a step of combining the emulsion precursor with a second material (that includes a first metal oxide with a dopant and/or a metal oxide precursor) to form an emulsion; and a step of processing such emulsion to separate at least one core-shell particle (configured according one of embodiments identified above) in which the core is surrounded by the outer shell. In at least one case, the dopant may include a second metal oxide and/or nanoparticles of a metal; and in at least one related case, the dopant includes exclusively nanoparticles of a metal. In each case when the dopant includes nanoparticles of the metal, the dopant may include any of nanoparticles of any of Ag, Au, Cu, Pt, Pd, Fe, Ni, Co, Zn, Ce, Al, Mn, In, W, Zr, Cr, Mo, Ru, and V.

In substantially every implementation, the method may be configured to additionally include a step of covering (prior to the step of mixing) the core with a polymeric material to form at least one fragment of material containing such core encapsulated with the inner shell made of the polymeric material and/or, under specific circumstances, such polymeric material may include a polyacrylate and/or a polymethacrylate and/or a poly(methacrylic acid). Alternatively or in addition, and substantially in every implementation of the method, the surfactant may include sodium dodecyl sulfate (SDS, SDBS) and/or cetrimonium bromide (CTAB), non-polar surfactant like hexadecanol, tetradecanol, octadecanol, Polyethylene Glycol (PEG 1000, PEG 2000), Aerosol OT, and/or Triton X-100. I substantially every implementation, the solvent may be either aqueous or non-aqueous and, when the solvent is non-aqueous, the solvent may include any of formamide, anhydrous liquid ammonia ($NH_3$), Ethylene diamine, Pyridine, $BF_3$ (Boron Tri Fluoride), Hydrogen Fluoride, $CH_3CooH$, and liquid sulfur dioxide. Alternatively or in addition, and substantially in every implementation of the method, the emulsion precursor may be configured as a micellar solution. Alternatively or in addition, and substantially in every implementation, the second material may include $TiO_2$ and/or ZnO and/or $SiO_2$ and/or CuO and/or $In_2O_3$ and/or $CeO_2$ and/or $TiO_2$-$CeO_2$ and/or $SiO_2$-$CeO_2$ and/or indium-tin oxide (ITO) and/or antimony-tin oxide (ATO) and/or $WO_3$ and/or $ZnFe_2O_4$ and/or $Al_2O_3$ and/or MnO and/or ZrO and/or NiO and/or $VO_2$ and/or $TiO_2$-$ZnFe_2O_4$, and/or $TiO_2$-ZnO, and/or $TiO_2$-$In_2O_3$, $TiO_2$-$SiO_2$-$CeO_2$. IN the specific case of the latter, the second material may contain $TiO_2$ in an amount exceeding 50 weight % with a remainder being the dopant (the dopant includes metal nanoparticles and/or a metal oxide material different from $TiO_2$). Alternatively or in addition, and substantially in every implementation, the metal oxide precursor may include tetrabutyl titanate and/or titanium iso-propoxide and/or titanium di-isopropoxide, and/or titanium di-isopropoxide bis (acetylacetonate), and/or titanium butoxide, and/or titanium acetylacetonate, and/or titanium IV Chloride.

In one specific case, the method may include a step of doping the first metal oxide to form the second material. Such step of doping may contain the actions of admixing a liquid precursor or a gaseous precursor to the first metal oxide at an elevated temperature, or the action of admixing a solid precursor to the first metal oxide (in the latter case, the solid precursor may be configured to include a MXene material that contains, in the form of nanoparticles, any of $Ti_3C_2$, $Ti_3AlC_2$, $Ti_4N_3$, and $Ti_3CN$. When appropriate, the step of doping may be carried out by thermochemical annealing or by hydrothermal reaction. In at least one case, the method may be configured to satisfy one of the following conditions: a) the dopant includes a carbonaceous dopant and/or a nitrogenous or nitrogen enriched dopant, or b) when the doping includes admixing the liquid precursor, the dopant may be a carbonaceous dopant and the liquid precursor may include hexane and/or heptane and/or an auxiliary saturated hydrocarbon, or c) when the doping includes admixing the gaseous precursor, the dopant may include nitrogen and/or nitrogenous or nitrogen enriched compound and the gaseous precursor may include ammonia.

Embodiments additionally provide a core-shell particle produced by an embodiment of the method identified above; and a method for creating a layer of coating that includes the following steps: forming a substantially liquidous material that contains a plurality of such core-shell particles, and depositing such substantially liquidous material onto a chosen substrate. The step of formation of a substantially liquidous material may contain, in at least one implementation, formation of any of liquid slurry, gel, and a hybrid solid liquid.

BRIEF DESCRIPTION OF THE DRAWINGS

Details of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 1A, 1B, 1C present empirically acquired images of a reversible temperature-dependent color change in a specific case of a TCM microencapsulated with the use of composite materials according to an embodiment of the invention.

FIGS. 2A and 2B illustrate, respectively, a high-resolution electron microscopic image and a schematic of a structure of an embodiment of a core-shell particle with the core containing a target core material microencapsulated with a composite material of the shell.

FIG. 5 illustrates a non-limiting example of a process of preparation of the core-shell morphology.

Figure 3:
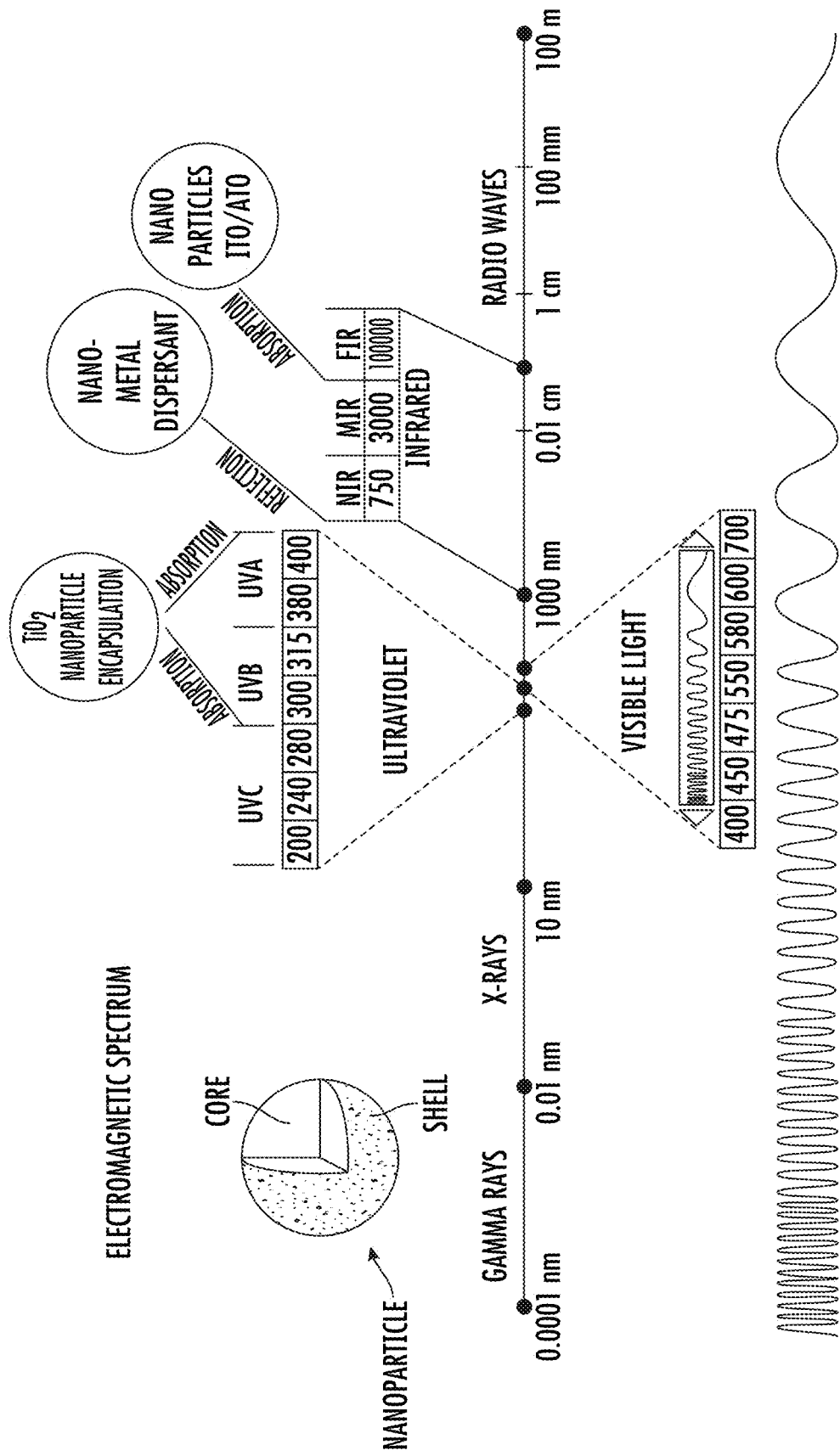
FIG. 3 is a schematic of the electromagnetic spectrum including wavelength ranges of reflection and absorption of the encapsulated polymeric nanoparticles disclosed herein. A schematic of a core-shell particle is also shown.

Generally, the sizes and relative scales of elements in Drawings may be set to be different from actual ones to appropriately facilitate simplicity, clarity, and understanding of the Drawings. For the same reason, not all elements present in one Drawing may necessarily be shown in another.

DETAILED DESCRIPTION

The table below illustrates energy and wavelength ranges of radiation recognized to dissociate the identified chemical bonds (see, for example, Vavra, S. 2019. Characterization of photodegradable polymers for UV-triggered release from microcapsules, *Master's thesis dissertation in Materials Chemistry, Chalmers University of Technology, Applied Chemistry, Sweden*).

| Chemical Bond | Wavelength (nm) | Energy (kJmol$^{-1}$) | Energy (eV) |
|---|---|---|---|
| C=C | 179 | 669.44 | 6.69 |
| C—C | 336 | 355.64 | 3.55 |
| C—H | 286-301 | 397.8-418.4 | 3.97-41.8 |
| C—O | 286-357 | 334.72-418.4 | 3.35-4.18 |
| C—Cl | 332-477 | 250.8-359.82 | 2.51-3.60 |
| C—Br | 408-636 | 188-292 | 1.88-2.92 |
| O—O | 817 | 146.46 | 1.46 |
| O—H | 249-336 | 85.115 | 0.85 |

Materials of interest for the formation of a core portion of a core-shell particle, discussed in this disclosure—which materials are aggregately referred to as "Current Target Materials"—and specifically polymer-based thermochromic materials (TCMs), phase-change materials (PCMs), and various auxiliary organic and polymeric materials as well as material elements such as particles of fibers made of such materials—also degrade when exposed to sunlight. In addition to UV, light in other frequency bands in the solar spectrum, such as infrared, etc., also contributes to degradation of these materials. (When used, the term "auxiliary organic and polymeric materials" denotes a portion of the Current Target Materials and is defined to refer to any of Methyl Orange, Methylene Blue, Methylene Red, Chlorephenol, Phenol, 4-nitrophenol, Phenol Red, Nitrobenzene N,N-dimethylformamide, Rhodamine B (RhB), Benzene Toluene Ethylbenzene O-xylene (BTEX), Direct Red 23, Aniline, Polyacetylene, polydiacetylene, polysilanes, poly-thiophenes, and poly-(phenylenevinylene)).

This problem of photodegradation of the Current Target Materials, persisting in related art and shortening lifetime and/or detrimentally changes optical and/or chemical and/or mechanical properties of structures and products that utilize such materials is solved by encapsulating such Current Target Materials within an outer shell that includes a metal oxide necessarily containing at least one specified dopant judiciously chosen to increase the opacity of such shell to target harmful light and to form a particle referred to as a "core-shell particle", in which the encapsulated target organic polymeric material forms the core. As a result of such encapsulation, the material of the core is substantially screened off by the shell from the exposure to the harmful light (such as the sunlight at the wavelengths to which the material of the core is photosensitive), thereby substantially preventing the otherwise occurring change of the optical/chemical/mechanical properties of the material of the core caused by the harmful light while, at the same time, maintaining advantageous properties of the core material (for example, thermochromic or phase-changing properties.)

As a result—and using a TCM material as a non-limiting example—the known property of the TCM material manifesting in a change of color as a function of temperature is preserved, and the encapsulated TCM material can be continuously and for a long time used in an appropriate application. One of such applications, for example, may be the addition of the TCM microencapsulated according to an embodiment of the invention as color-changing additive to concrete or paint. Indeed, a thermochromic dye, forming the basis of a Current Target Material used in a core-shell particle generated according to the idea of the invention, is known to be a substance that changes color in response to changes in temperature. Accordingly—and in reference to FIGS. 1A, 1B, 1C—the products utilizing the discussed herein core-shell particles gain the ability to change color due to the presence of the thermochromic dye in such products.

The resulting microcapsules (which are referred to in this application as core-shell particles) have additional features of improving the adhesiveness in addition to its protection from the photodegradation process.

The idea of the invention stems from the realization that, while the attempts to protect the TCM materials from the harmful effect produced by the sunlight have been previously attempted (for example, as discussed in PCT/US2018/030886 published as WO 2018/204640, the entire disclosure of which is incorporated by reference herein), the related art has not taken advantage of the possibility to employ the radiation-reflecting properties of various metals for protection of the broader range of materials that constitute the Current Target Materials. At least one implementation of the idea of the invention, however, utilizes the doping of the material—from which the radiation-shielding shell of a Current Target Material is made—with metallic nanoparticles (nanoparticles of a metal) and/or a carbonaceous dopant and/or a nitrogenous dopant (in which case the dopant is a material including carbon and/or nitrogen).

Notably, encapsulation of the core containing Current Target Materials with any shell that includes only the material that is substantially transparent to light at such wavelength that is harmful (that is, it causes the photodegradation) of the core material is substantially meaningless and undesirable as such procedure does not result in protection of the core material of the core-shell particle. Understandably, then, that protection of the Current Target Materials forming the core of the core-shell particle from light at wavelength(s) in the range of the electromagnetic spectrum of the most interest (which includes at least part of UV-B and UV-A spectral range, visible spectral range, and near-IR spectral range), the outer shell that utilizes exclusively silica, for example (that is, which consists of only silica) is not intended to be used and for that reason is expressly excluded from the scope of the invention.

The inventors successfully fabricated, for example, core-shell structures configured according to an embodiment of the invention by encapsulating organic thermochromic particles using the microemulsion technique. The outer shell material was formatted to include a doped metal oxide material where the metal oxide and a dopant were chosen from at least $CeO_2$, $ZnO$, $WO_3$, $Fe_2O_3$, $CuO$, $In_2O_3$, Indium Tin Oxide (ITO), Antimony Tin Oxide (ATO), $ZnFe_2O_4$, $SiO_2$, $Al_2O_3$, $MnO$, $ZrO_2$, $NiO$, $TiO_2$-$ZnFe_2O_4$, $TiO_2$-$ZnO$, $TiO_2$-$In_2O_3$, $TiO_2$-$SiO_2$-$CeO_2$ and $VO_2$ such that the host material and the dopant are not the same.

As used herein, the term "effective amount" refers to an amount that is sufficient to achieve the desired modification of physical and/or chemical and/or mechanical property of the composition of materials or a single material. For example, an "effective amount" of a dopant in the outer shell of a core-shell particle refers to an amount that is sufficient to achieve the desired improvement in the property modulated by the formulation component, e.g. achieving the substantial absorption of solar radiation having the desired wavelength range. The specific level in terms of weight-percent (wt %) in a composition required as an effective amount will depend upon a variety of factors including the amount and type of metal or metal oxide making up the outer shell, presence or absence of an intermediate encapsulating layer and/or a polymeric inner shell or core-encapsulating coating around the core of the particle, and end use of any coatings or materials made using the core-shell particles. The terms "optional" or "optionally" means that the subsequently described event or circumstance can or cannot occur, and that the description includes instances where said event or circumstance occurs and instances where it does not. As used herein, a "cool roof coating" is a coating applied to the roof of a building, such as, for example, the flat roof of an industrial building or warehouse, to reflect sunlight, thereby lowering the energy needs for the building. In one aspect, disclosed herein are coatings including the microencapsulated thermochromic materials and/or core shell particles disclosed herein, wherein the coatings absorb heat at hotter temperatures and become white or light-colored at higher temperatures, thus acting as cool roof coatings. Further in this aspect, these coatings can increase the energy efficiency of the buildings to which they are applied. In another aspect, these coatings have a useful lifetime of 10 years or more, further reducing costs associated with reapplication. In one aspect, the coatings are self-cleaning with respect to volatile organic compounds and other contaminants with which they come into contact, since the metals and metal oxides in the outer shells of the core shell particles used in the coatings have the ability to photocatalytically degrade small organic molecules on their outer surfaces. Unless otherwise specified, temperatures referred to herein are based on atmospheric pressure (i.e. one atmosphere).

Core-Shell Particles Including Current Target Materials

In reference to FIGS. 2A, 2B, embodiments of the invention provide a core-shell particle in which the core includes a Current Target Material which is encapsulated with an outer shell that includes metal oxide doped with identified dopants among which there may be nanoparticles of metal, and which optionally includes an additional-inner-shell that also encapsulates the Current Target Material and that is, in turn, encapsulated with the outer shell.

In some embodiments, the outer shell is configured to absorb or reflect a first portion of radiation having a wavelength in a range of from about 320 to about 2500 nm, or in a range having endpoints selected from about 320, 340, 360, 380, 400, 420, 440, 460, 480, 500, 520, 540, 560, 580, 600, 620, 640, 660, 680, 700, 720, 740, 760, 780, 800, 820, 840, 860, 880, 900, 920, 940, 960, 980, 1000, 1020, 1040, 1060, 1080, 1100, 1120, 1140, 1160, 1180, 1200, 1220, 1240, 1260, 1280, 1300, 1320, 1340, 1360, 1380, 1400, 1420, 1440, 1460, 1480, 1500, 1520, 1540, 1560, 1580, 1600, 1620, 1640, 1660, 1680, 1700, 1720, 1740, 1760, 1780, 1800, 1820, 1840, 1860, 1880, 1900, 1920, 1940, 1960, 1980, 2000, 2020, 2040, 2060, 2080, 2100, 2120, 2140, 2160, 2180, 2200, 2220, 2240, 2260, 2280, 2300, 2320, 2340, 2360, 2380, 2400, 2420, 2440, 2460, 2480, or about 2500 nm. In another aspect, the shell allows a second portion of radiation having a wavelength of from about 320 to about 2500 nm, but outside the spectral range of the first portion, to pass through.

In at least one implementation, at least the outer shell absorbs or reflects radiation at a wavelength falling within at least the UV-A range (e.g., from about 315 to about 410 nm or so) and, in particular in the range from about 390 nm to about 410 nm, or in the near IR range (e.g. from about 800 to about 1500 nm), while allowing radiation at a wavelength outside these ranges to pass through the outer shell.

In reference to FIG. 3, and in at least one implementation, the shell(s) present over the core of the core-shell particle (that is, either the outer shell only or the combination of the inner shell and the outer shell) is/are configured to absorb or reflect a first radiation having a first wavelength in a first range from about 320 nm to about 2500 nm to substantially prevent the first radiation from penetrating through the coating, while allowing a second radiation having a second wavelength outside the first range to pass through the shell(s). Alternatively or in addition, and in at least one implementation, the shell(s) present over the core is/are configured to absorb or reflect the first radiation having the first wavelength in a second range from about 390 nm to about 410 nm to substantially prevent the first radiation from being transmitted through the coating while allowing a third radiation having a third wavelength within the first range but outside the second range to pass through the shell(s). Alternatively, or in addition, and in at least one implementation, the shell(s) present over the core is/are configured to absorb or reflect the first radiation having the first wavelength within a third range from about 410 nm to about 700 nm to substantially prevent the first radiation from being transferred through the coating while allowing a fourth radiation having a fourth wavelength within the first range but outside the third range to pass through the shell(s). Alternatively or in addition, and in at least one implementation, the shell(s) present over the core is/are configured to absorb or reflect the first radiation having the first wavelength in a fourth range from about 690 nm to about 710 nm to substantially prevent the first radiation from being transmitted through the coating while allowing a fourth radiation having a fourth wavelength within the first range but outside the fourth range to pass through the shell(s). Alternatively or in addition, the shell(s) present over the core is/are configured to absorb or reflect the first radiation having the first wavelength within a fifth range from about 800 nm to about 1500 nm to substantially prevent the first radiation from being transmitted through the coating while allowing a fifth radiation having a fifth wavelength within the first range but outside the fourth range to pass through the shell(s).

Examples of Materials Used for Construction of a Core-Shell Particle.

Generally, when the thermochromic material is being encapsulated, such material can be an inorganic thermochromic material, an organic thermochromic material, a polymeric thermochromic material, or an organic-inorganic hybrid thermochromic material. In at least one specific case, such TCM includes at least one of crystal violet lactone, spirolactones, fluorans, spirooxazine, and spiropyran.

In at least one implementation, the metal oxide material for the outer shell of the core-shell particle can include a first material from, for example, $TiO_2$, ZnO, $SiO_2$, CuO, $In_2O_3$, $CeO_2$, indium-tin oxide (ITO), antimony-tin oxide (ATO), $WO_3$, $ZnFe_2O_4$, $Al_2O_3$, MnO, ZrO, NiO and $VO_2$ under the condition that such first material is doped with another metal oxide (that is different from the first material) and/or with nanoparticles of metal (which metal includes at least any of Ag, Au, Cu, Pt, Pd, Fe, Ni, Co, Zn, Ce, Al, Mn, In, W, Zr, Cr, Mo, Ru, and V. The dopant to the metal oxide material of the outer shell may also include a carbonaceous dopant (such as any of hexane, heptane, benzene, toluene, activated carbon, carbon nanotubes—whether SWCNT or MWCNT, carbon nanofibers, graphene, and graphene oxides) and/or a nitrogenous dopant (such as any of ammonia, boron nitride nanotubes, ammonium nitrate, urea, calcium nitrate, and potassium nitrate).

In a specific case when the metal oxide material used for construction of the outer shell includes titania ($TiO_2$), titania is present in an amount exceeding 50 weight %, with at least a portion of a remainder being the dopant that includes metal nanoparticles and/or a metal oxide material different from $TiO_2$. Generally, the outer shell is chosen to be at least 30 nm thick in order to ensure that attenuation of light at a target wavelength from which the core material is being screened off is substantially complete. When the material of the core is additionally encapsulated with the inner, polymeric shell, the material for such inner shell may include at least any of polyacrylate, polymethacrylate, and a poly(methacrylic acid).

Notably, fine-tuning of the composition of the metal oxide and/or dopant(s) in it is selected targeting specific wavelength ranges for absorption or reflection of incident radiation. In a further aspect, the metal oxide can include three or more components and, in at least one implementation of the later—crystal violet lactone (CVL), bisphenol A (BPA) and tetradecanol (TD).

In a specific implementation in which the core material is embodied into a polymeric inner shell, an embodiment of a core-shell particle may additionally include an intermediate encapsulating layer (that is formed between the polymeric capsule/inner shell and the outer shell). The intermediate encapsulating layer can be made from an inorganic oxide. In one aspect, the inorganic oxide can be ZnO, $SiO_2$, CuO, $In_2O_3$, $CeO_2$, indium-tin oxide (ITO), antimony-tin oxide (ATO), $WO_3$, $ZnFe_2O_4$, $Al_2O_3$, MnO, ZrO, NiO and $VO_2$ or any combination thereof. Such inorganic oxide layer can form a barrier between the polymeric capsule and an outer shell that contains a photocatalytic substance such as, for example, $TiO_2$, thereby protecting the polymeric inner shell and the Current Target Material inside it from photocatalyzed reactions in the presence of $TiO_2$ and residual moisture that may be present in the system.

In some embodiments, a dopant can be a carbonaceous dopant (such as hexane, heptane, benzene, toluene, activated carbon, carbon nanotubes, carbon nanofibers, graphene, and/or a graphene oxide) and/or wherein the nitrogenous dopant (that includes, for example, any of ammonia, boron nitride nanotubes, ammonium nitrate, urea, calcium nitrate, and potassium nitrate. In such a case the process of doping of the metal oxide material for forming the outer shell may include a step of admixing a liquid or gaseous precursor in a thermochemical annealing furnace or a hydrothermal reactor. In one aspect, when the dopant includes carbon, the liquid precursor can be hexane, heptane, or another saturated hydrocarbon. In an alternative aspect, the dopant can contain nitrogen and the gaseous precursor can include ammonia. In at least one implementation, the process of doping can be carried out at an elevated temperature from about 300 to about 400° C., or at about 300, 305, 310, 315, 320, 325, 330, 335, 340, 345, 350, 355, 360, 365, 370, 375, 380, 385, 390, 395, or about 400° C., or a combination of any of the foregoing values, or a range encompassing any of the foregoing values. Alternatively, the process of doping can be carried out using a high energy ball milling process. In any of these cases aspects, success of the doping process can be confirmed by standard experimental techniques including, but not limited to, scanning electron microscopy (SEM), energy-dispersive X-ray spectroscopy (EDS), X-ray diffraction (XRD), another technique, or a combination thereof. Understandably, selection of the dopant and amount of the dopant can allow for targeting a specific wavelength of light to be substantially blocked by the outer shell of the core-shell particle from reaching the Current Target Material of the core.

Pigments, Paints, and Coatings Incorporating the Core-Shell Particles

Practical use of the core-shell particles, produced according to the idea of the invention and representing pigment, can be realized when such particles are used as a basis for paints or coatings, for example. Here, the plurality of core-shell particles is mixed with at least a binder material (such as solidum silicate or potassium silicate, for example) to form a substantially liquid material—for example, in a form of liquid slurry or gel—that is the basis for a paint or coatings to be used at an outdoor surface, in at least one specific case. The intended outdoor surface can be the exterior surface of a building such as a roof. Due to the nature of optical properties of the core-shell particles, discussed above, the optical properties of the paints or coatings created with the use of such particles substantially resemble and substantially equal to the optical properties of the particles themselves. In at least one case, an embodiment of a coating formed on the basis of the core-shell particles is characterized by a useful lifetime of at least 10 years or at least a useful lifetime that is longer than a lifetime of a coating that includes at least one of the Current Target Materials but lacks the core-shell particles (which has a much shorter useful lifetime, typically on the order of 1 to 2 years, based on practical experience). This effect is readily understood, as prevention of the radiation-induced damage of the Current Target Material appropriately encapsulated in the core-shell particle causes the extension of the useful lifetime of the corresponding product.

Examples of a Method for Encapsulating a Core Material and/or a Polymeric Capsule Containing the Core Material Generally, a process for encapsulating included a step of mixing at least one fragment of a first material (that includes a TCM and/or a PCM and/or an auxiliary material as defined above—that is, the first material chosen from the Current Target Materials) with a surfactant in a solvent to form an emulsion precursor. Notably, in at least one case the emulsion precursor forms a micellar solution.

Such emulsion precursor was then combined with a second material (that includes a first metal oxide with a dopant and/or a metal oxide precursor) to form an emulsion; and then the emulsion is further processed to separate at least one core-shell particle structured as discussed above (to include the core containing the first material and surrounded by the outer shell).

Notably, neither the first metal oxide, nor the metal oxide precursor does not consist (only of) and/or does not result in the formation of (only) $SiO_2$. In at least one case, the metal oxide precursor can include tetrabutyl titanate, titanium iso-propoxide, titanium di-isopropoxide, titanium di-iso-propoxide bis (acetylacetonate), titanium butoxide, titanium acetylacetonate, titanium IV Chloride or any combination thereof The surfactant could include any combination of sodium dodecyl sulfate (SDS, SDBS), cetrimonium bromide (CTAB), Triton X-100, non-polar surfactant like hexadecanol, tetradecanol, octadecanol, Polyethylene Glycol (PEG 1000, PEG 2000), and/or Aerosol OT In at least one case the solvent can be non-aqueous (in which case such solvent can include any of formamide, anhydrous liquid ammonia ($NH_3$), Ethylene diamine, Pyridine, $BF_3$ (Boron Tri Fluoride), Hydrogen Fluoride, $CH_3CooH$, and liquid sulfur dioxide.

The following examples are intended put forth so as to provide those of ordinary skill in the art with a complete disclosure and description of how the compounds, compositions, articles, devices and/or methods claimed herein are made and evaluated, and are intended to be purely exemplary of the disclosure and are not intended to limit the scope of what the inventors regard as their disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Example 1 of formation of an embodiment of the core-shell particle discussed below addresses (A) the process of preparation of a three-component TCM core material, (B) the process of optional polymer encapsulation of the core material to form an inner shell of the future core-shell particle, and (C) the process formation of the outer shell material to encapsulate the inner shell (together with the core contained inside the inner shell).

Example 1

(A) Example of Synthesis of a Core of the Core-Shell Particle

A typical embodiment of a thermochromic system (blue dye) may be prepared using a three component system such as crystal violet lactone (CVL), bisphenol A (BPA) and tetradecanol (TD) with different mixing ratios such as 1:4:70, 1:4:60 and 1:4:50. In some experiments, the relative amount of BPA was changed to 6 and three more samples prepared with the ratio of 1:6:70, 1:6:60 and 1:6:50. This concentration optimization is needed to obtain a dark blue color thermochromic material (TCM) dye with transition temperature of 30-35° C.

At least in one implementation, the procedure for the TCM dye preparation was as follows. Appropriate weight (in x grams, where x=0.1 to 1.0 g) of TD in a clean beaker was taken and stirred at ~100 rpm on a hot plate at a temperature of ~80° C. until completely melted. Next, an appropriate quantity (in y grams, where y=1 to 2 g) of CVL is added, the stirring speed was increased to 400 rpm, and the mixture is stirred for 10-30 minutes. In the third and final step, an appropriate quantity of BPA was added (in z grams, where z=10 to to the previous solution and stirred for additional 1-2 hours. The as-prepared TCM after curing treatment (filtration and consecutive drying process) was stored at room temperature for the following microencapsulation process.

(B) Example of Preparation of the Optional Inner Shell (Polymeric Shell).

As was alluded to above, microencapsulation of a core material could be carried out in one of two related ways. In the first scenario, the material prepared to form a core of the core-shell particle can be directly encapsulate with the material designated to form the outer shell of the particle. In the second scenario, the material prepared to form a core of the particle is first embodied into a polymeric material forming the encapsulating polymeric inner shell, and then the inner shell (now containing the core material inside) is additionally encapsulated in the material chosen to form the outer shell.

When the second, optional scenario is used preparation of an intermediate (inner shell) encapsulating layer may be carried out via emulsification processes at a higher speed of homogenization. In one implementation, all the chemicals, including methyl methacrylate (MMA), methacrylic acid (MA), ethylene glycol dimethacrylate (EGD), PEG 1000, ferrous sulfate heptahydrate (FSH), ammonium persulfate (APS), tert-butylhydroperoxide (TB), and sodium thiosulfate (STS) are procured with high purity grade (>95%) and used without any further purification. Deionized $H_2O$ (DI) and solvents such as ethanol were used as needed for chemical reactions and washing of products.

Solution A was prepared by taking an appropriate amount of PEG as surfactant (range, 0.1-1 g), mixed with DI water (50-100 mL), and stirred at high speed (for example, at about 10000 rpm) via homogenizer with the temperature increased to 50° C. An appropriate quantity of the previously prepared material (in one specific case—TCM, as discussed above; for example between 10 g and 20 g) was added to the PEG/DI solution and stirred at the same speed of 10000 rpm and at the same temperature of about 50° C.

Solution B containing MMA and MA as monomers (with different ratios of 95-99 mL MMA to 5-1 mL MA) and EGD as cross-linker (0-1 mL) were stirred together in a clean beaker for an hour. Next, solution B was added to solution A in a dropwise manner while solution A was stirred at 10000 rpm, to form solution (A+B), and then held at 50° C. for an additional hour.

Stock Solution C was prepared with FSH as an initiator (range, 0.1-0.2 g), mixed with 50-100 mL DI $H_2O$, and stirred independently for 30 minutes at room temperature. About 0.1-0.5 mL of stock solution C was then added to the solution (A+B) dropwise and stirred at 10000 rpm and at 50° C. for 30 minutes to an hour. The resulting solution is now referred to as solution (A+B+C) or as solution D.

Next, an appropriate quantity of APS (range, 0.1–0.5 g) was added dropwise to solution D and stirred with the same speed and temperature as above. After stirring for 30 minutes, STS and TB combinations with ranges of 0.1-0.5 g were added to APS/solution D and stirred for additional 30 minutes. The resulting solution is now referred to as solution E and contains a solution D+APS+STS+TB. The speed of stirring was reduced to 1000-2000 rpm and the temperature was increased to the range of 75-90° C. Solution E was then purged under nitrogen, and continuous stirring and at 75-90° C. was conducted for at least 3-4 hours. The final emulsion was washed several times with DI water and vacuum dried at 40° C. overnight.

The dried polymer encapsulated core material (in one specific example, TCM blue dye) was powdered using an agate mortar and pestle for further characterization and transition property measurements.

(C) Example of Preparation of a Doped Metal Oxide Outer Shell.

In one case, a direct microencapsulation of the core material or microencapsulation of the polymer-encapsulated core material with the material configured to form an outer shell of the core-shell particle was carried out using different metal oxides (MOs) identified above using the following procedure. Here, the object to be encapsulated—be it a predefined quantity of the core material or the polymer-encapsulated core material—is referred to as a seed.

This core-shell structure with different ratios of seeds with $TiO_2$ (or other MOs) were prepared, in one example, via in situ-polycondensation using a non-aqueous emulsion templating process. A 1000 mL, three-neck flask was used which is initially filled with 250 mL of formamide (a non-aqueous solvent). Different amounts of the seeds (ranging from 5-20 g) and SDS (or other appropriate surfactant; ranging from 1-10 g) were added to the formamide stepwise under vigorous stirring to form an oil-in-water (O/W) emulsion where the formamide acts as water phase and the seeds behave as an oil phase. This seed-micelle solution is labeled as solution X.

Different amounts of the Ti-precursor, such as tetrabutyl titanate (TBT) or titanium iso-propoxide (TIP), were added to the emulsion (solution A) with stirring for 10-30 minutes. Then about 100-200 mL of formamide with 10-20 g of DI water (solution Y) was added dropwise into the flask containing solution X over 2 h under vigorous stirring, ranging from 5000-10000 rpm. The resultant solution (X+Y=solution Z) was kept at constant temperature of 45° C. with stirring for 2-5 hours, which resulted in a white precipitate. About 15 mL of aqueous solution containing 5-10 g of sodium fluoride was added to the suspension, or solution C, and this solution was heated to 70° C. with continuous stirring for 24 h to complete the formation of $TiO_2$/MO outer shell layer, which was then washed several times with DI water and ethanol and then vacuum dried at 40° C. overnight before use these core-shell powders for characterization and property measurements.

Various precursor materials of nanoparticles of metal materials (that were identified above) or /metal oxides were used as dispersants in this in situ-polycondensation process. It remains within the scope of the invention to appropriately adjust the concentration of metal nanoparticles, for example, to achieve optimum optical opacity (in terms of either reflecting or absorbing light at the target wavelengths that may harm the core material).

Figure 4A:
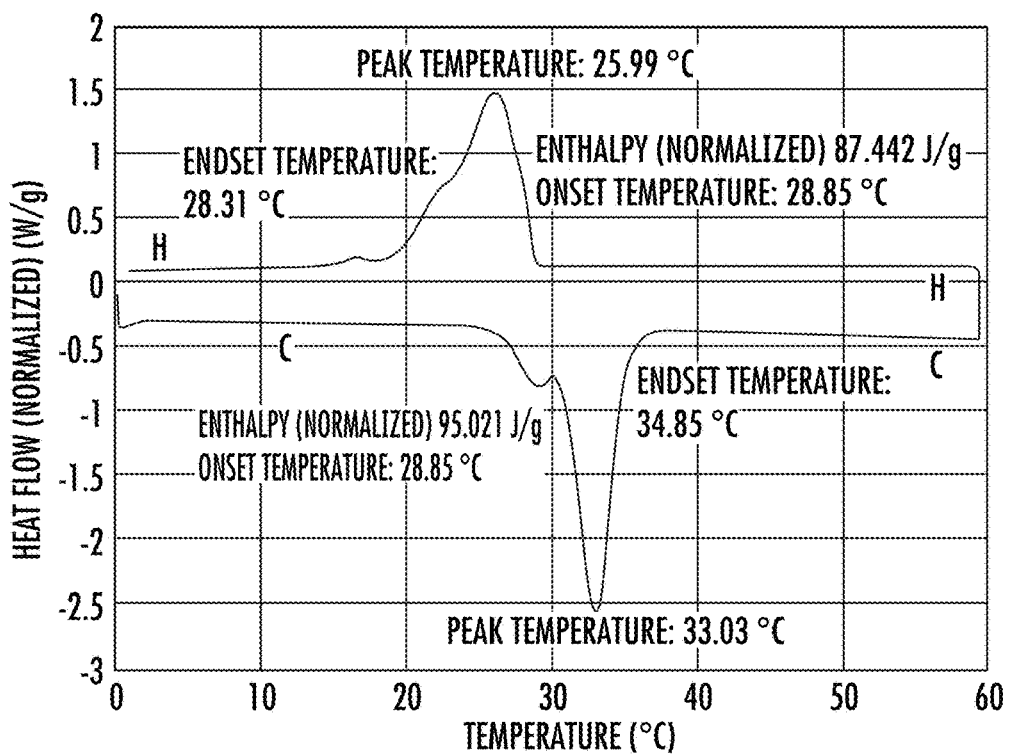
FIGS. 4A, 4B present differential scanning calorimetry (DSC) thermograms of heating (red lines, H) and cooling (blue lines, C) of plain thermochromic material (FIG. 4A) and a thermochromic material microencapsulated according to an embodiment of the invention (FIG. 4B).
Figure 4B:
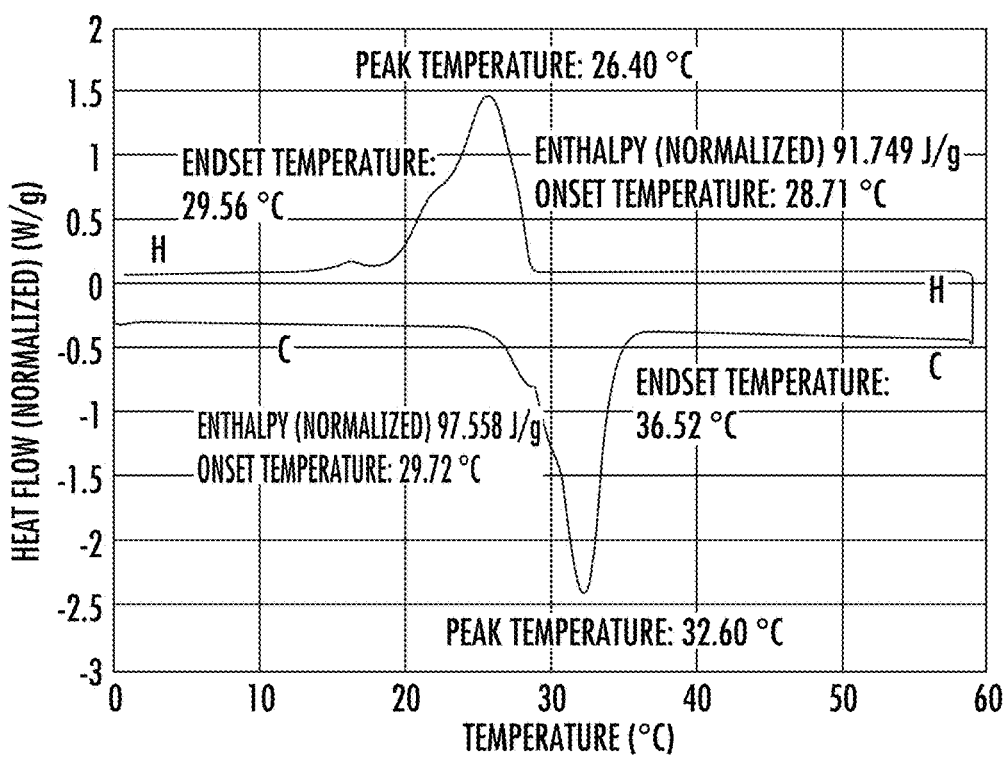

FIGS. 4A and 4B illustrate thermograms of a TCM used for formation of a core of an embodiment of the invention and those of the microencapsulated TCM-based core.

Example 2

(A) Example of Synthesis of a Core of the Core-Shell Particle

Here, the implementation of the preparation of the core material from a Current Target Material is substantially the same as that discussed in Example 1.

(B) Example of Preparation of the Optional Inner Shell (Polymeric Shell).

Here, the implementation of the preparation of the polymer inner shell materials that is used to encapsulate a Current Target Material as the core is substantially the same as that discussed in Example 1.

(C) Example of Preparation of a Doped Metal Oxide Outer Shell.

During yet another part of the fabrication process, the metal-oxide doped with metal nanoparticles is prepared (for example with the use of a sol-gel approach) as a material for the outer shell that is applied either directly to the Current Target Material-based core material or to the Current Target Material preliminarily encapsulated with the polymeric (inner) shell. Below, TCM -base core is used as an example.

Here, for example, a predetermined amount of titanium isopropoxide was mixed with the solvent, Isopropanol and it was stirred at about 600 rpm and at about 60° C., and then about 250 ml of DI water was added. The above liquid mixture (titanium precursor+solvent+DI water was labeled as Solution A) The solution A was heated to 100° C. in a round bottom flask and this mixture was distilled for about 4 hours. Then about 2 g of tetra methyl ammonium hydroxide was added to the pre-distilled solution A and the refluxed both for about 6 hrs. The above refluxed mixture solution A+tetra methyl ammonium hydroxide was named as solution B. The appropriate amount of metal nanoparticle/metal oxide precursor solution mentioned above involving $TiO2$ and dopant(s), were ad-mixed to solution B and refluxed under the same experimental conditions for another 2 hrs. This solution B+metal nanoparticle/metal oxide precursor solution was labeled as solution C. Thus, Solution C, (called as hydrated monodisperse colloidal anatase titania shell material doped with metal nanoparticle/metal oxide). was thoroughly washed with DI water and ethanol and dried at 40° C. Then the metal nanoparticle/metal oxide doped titania powder was mixed with ethanol and then added to the TCM-based core as mentioned above material to form the outer shell directly on such TCM-based material or to the preliminarily encapsulated with polymer microcapsules of the TCM-based core material, drop wise at 50° C. and stirred at about 1000 rpm for 3-4 hrs. The final solution prepared from solution C+TCM based core polymer inner shell material was labeled as Solution D.

The final product (solution D) was filtered on filter paper then washed thoroughly with ethanol and DI water and kept it for drying at room temperature for 24 hrs. The resulting metal nanoparticle/metal oxide doped titania particles was then grinded and stored in a glass container.

Example 3

Figure 5:
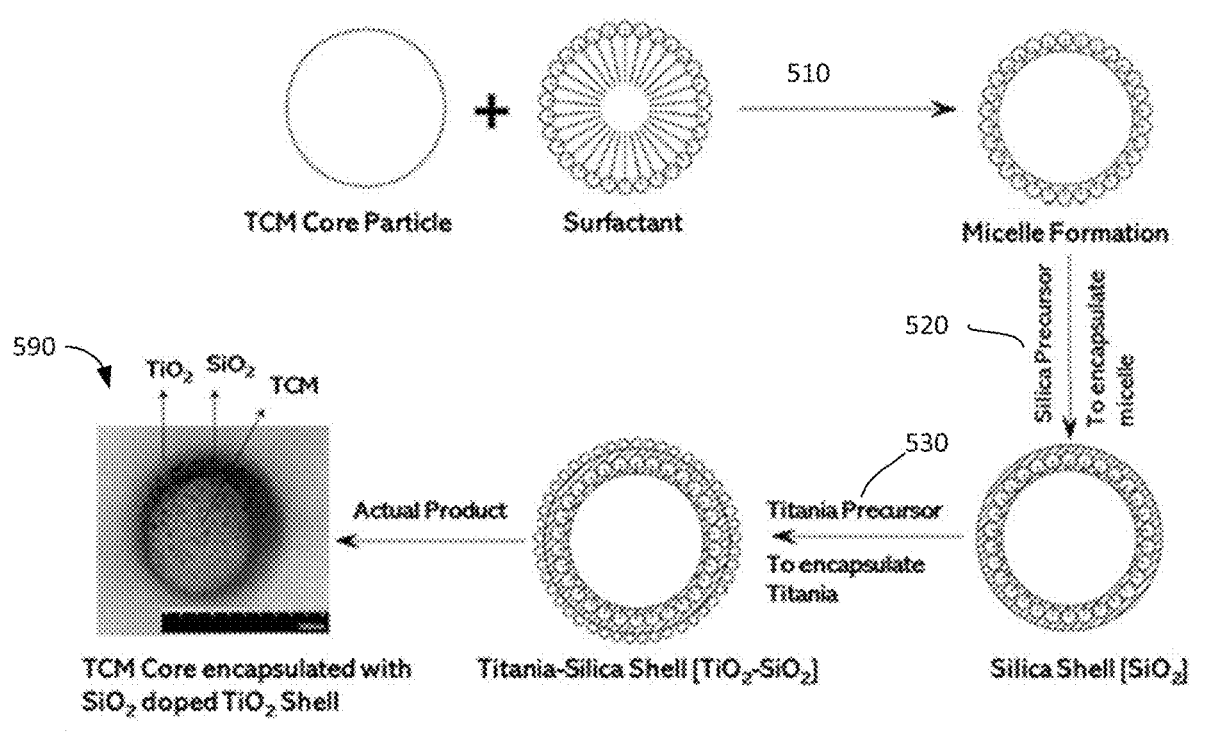

In one specific example, illustrated schematically in FIG. 5, the preparation of the core-shell morphology (encapsulated thermochromic core particles with silica doped titania) involved the following steps:

Step 510: Micelle formation of a TCM core by microemulsion technique using suitable surfactant(s) such as, for example, sodium dodecyl sulfate (SDS, SDBS) and/or cetrimonium bromide (CTAB), and/or non-polar surfactant (such as hexadecanol, Polyethylene Glycol (PEG 1000, PEG 2000), Aerosol OT, and/or Triton X-100).

Step 520: Effectuating interaction of silica precursor (such as, in a non-limiting example, tetraethylorthosilicate, TEOS) with micelle to form a silica shell (in the form of an intermediate layer).

Step 530: Carrying out interaction of hydrolyzed titania precursor (such as, for example, titanium butoxide) with the silica matrix, and, After the curing treatment, formation of the shell layer from titania that was doped with silica matrix as demonstrated in the microstructure Transmission Electron Microscopy image 590 of FIG. 5.

For the purposes of this disclosure and the appended claims, the use of the terms "substantially", "approximately", "about" and similar terms in reference to a descriptor of a value, element, property or characteristic at hand is intended to emphasize that the value, element, property, or characteristic referred to, while not necessarily being exactly as stated, would nevertheless be considered, for practical purposes, as stated by a person of skill in the art. These terms, as applied to a specified characteristic or quality descriptor means "mostly", "mainly", "considerably", "by and large", "essentially", "to great or significant extent", "largely but not necessarily wholly the same" such as to reasonably denote language of approximation and describe the specified characteristic or descriptor so that its scope would be understood by a person of ordinary skill in the art. In one specific case, the terms "approximately", "substantially", and "about", when used in reference to a numerical value, represent a range of plus or minus 20% with respect to the specified value, more preferably plus or minus 10%, even more preferably plus or minus 5%, most preferably plus or minus 2% with respect to the specified value. As a non-limiting example, two values being "substantially equal" to one another implies that the difference between the two values may be within the range of +/−20% of the value itself, preferably within the +/−10% range of the value itself, more preferably within the range of +/−5% of the value itself, and even more preferably within the range of +/−2% or less of the value itself The use of these terms in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated falls and may vary within a numerical range defined by an experimental measurement error that is typical when using a measurement method accepted in the art for such purposes.

It should be emphasized that the above-described embodiments of the present disclosure are merely possible examples of implementations set forth for a clear understanding of the principles of the implementation of the idea of the invention. Many variations and modifications may be made to the above-described embodiment(s) without departing substantially from the spirit and principles of the disclosure.

Accordingly, the invention should not be viewed as being limited to the disclosed embodiment(s).

What is claimed is:

1. A core-shell particle comprising:
   (1a) a core containing a thermochromic material (TCM) and/or a phase-change material (PCM) and/or an auxiliary material containing organic and/or polymeric material;
   (1b) an outer shell surrounding the core, a material of the outer shell comprising a first metal oxide that contains a dopant; and
   (1c) an inner shell encapsulating the core and disposed between the core and the outer shell, the inner shell comprising a polyacrylate and/or a polymethacrylate and/or a polymetacrylic acid.

2. The core-shell particle according to claim 1, wherein the dopant includes a second metal oxide and/or nanoparticles of a metal.

3. The core-shell particle according to claim 2, wherein when the dopant includes nanoparticles of the metal, the dopant includes nanoparticles of any of Ag, Au, Cu, Pt, Pd, Fe, Ni, Co, Zn, Ce, Al, Mn, In, W, Zr, Cr, Mo, Ru, and V.

4. The core-shell particle according to one of claims 1, wherein the dopant includes nanoparticles of a metal.

5. The core-shell particle according to claim 1, wherein a thickness of the outer shell is at least 30 nm to prevent light at a wavelength from at least a UV-A spectral region from penetrating through the outer shell.

6. The core-shell particle according to claim 1, wherein the TCM includes an organic thermochromic material and/or a polymeric thermochromic material.

7. The core-shell particle according to claim 1, wherein the TCM includes at least one of crystal violet lactone, spirolactones, fluorans, spirooxazine, and spiropyran.

8. The core-shell particle according to claim 1, wherein the material of the outer shell comprises $TiO_2$ and/or ZnO and/or $SiO_2$ and/or CuO and/or $In_2O_3$ and/or $CeO_2$ and/or $TiO_2$-$CeO_2$ and/or $SiO_2$-$CeO_2$ and/or indium-tin oxide (ITO) and/or antimony-tin oxide (ATO) and/or $WO_3$ and/or $ZnFe_2O_4$ and/or $Al_2O_3$ and/or MnO and/or ZrO and/or NiO and/or $VO_2$ and/or $TiO_2$-$ZnFe_2O_4$, and/or $TiO_2$-ZnO, and/or $TiO_2$-$In_2O_3$, $TiO_2$-$SiO_2$-$CeO_2$.

9. The core-shell particle according to claim 1, wherein the material of the outer shell comprises, in an amount exceeding 50 weight %, $TiO_2$ with at least a portion of a remainder being the dopant that includes metal nanoparticles and/or with a metal oxide material different from $TiO_2$.

10. The core-shell particle according to claim 1, wherein the dopant comprises a carbonaceous dopant and/or a nitrogenous dopant.

11. The core-shell particle according to claim 10, wherein the carbonaceous dopant includes any of hexane, heptane, benzene, toluene, activated carbon, carbon nanotubes, carbon nanofibers, graphene, and graphene oxide, and wherein the nitrogenous dopant includes any of ammonia, boron nitride nanotubes, ammonium nitrate, urea, calcium nitrate, and potassium nitrate.

12. The core-shell particle according claim 1, wherein the material of the outer shell does not consist of a $SiO_2$.

13. A pigment comprising a plurality of core-shell particles according to claim 1.

14. A coating comprising the pigment according to claim 13 and a binder material.

15. The coating according to claim 14, wherein:

(17a) The coating has a useful lifetime of at least 10 years, and/or (17b) The coating is configured to absorb or reflect a first radiation having a first wavelength in a first range from about 320 nm to about 2500 nm to substantially prevent the first radiation from penetrating through the coating, while allowing a second radiation having a second wavelength outside the first range to pass through the coating, and/or (17c) The coating is configured to absorb or reflect the first radiation having the first wavelength in a second range from about 390 nm to about 410 nm to substantially prevent the first radiation from being transmitted through the coating while allowing a third radiation having a third wavelength within the first range but outside the second range to pass through the coating, and/or (17d) The coating is configured to absorb or reflect the first radiation having the first wavelength within a third range from about 410 nm to about 700 nm to substantially prevent the first radiation from being transferred through the coating while allowing a fourth radiation having a fourth wavelength within the firs range but outside the third range to pass through the coating, and/or (17e) The coating is configured to absorb or reflect the first radiation having the first wavelength in a fourth range from about 690 nm to about 710 nm to substantially prevent the first radiation from being transmitted through the coating while allowing a fourth radiation having a fourth wavelength within the first range but outside the fourth range to pass through the coating, and/or (17f) The coating is configured to absorb or reflect the first radiation having the first wavelength within a fifth range from about 800 nm to about 1500 nm to substantially prevent the first radiation from being transmitted through the coating while allowing a fifth radiation having a fifth wavelength within the first range but outside the fourth range to pass through the coating.

* * * * *